Patented Dec. 25, 1951

2,579,939

UNITED STATES PATENT OFFICE 2,579,939

MOLDING COMPOSITION AND ARTICLES PRODUCED THEREFROM

Richard Lindenfelser, Stamford, Conn., and Clarence L. Michaud, Philadelphia, Pa., assignors to American Cyanamid Company, New York, N. Y., a corporation of Maine No Drawing. Application June 6, 1950,
Serial No. 166,538

15 Claims. (Cl. 260—21)

This invention relates to molding compositions and, more particularly, to aminoplastic molding compositions, such as melamine-formaldehyde thermosetting resins and guanamine-formaldehyde thermosetting resins, wherein the guanamines are those having the general formula:

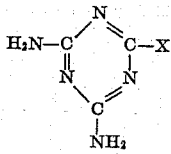

wherein X is a member of the group consisting of H, an alkyl group containing from 1-6 carbon atoms inclusive, a phenyl group, and an alkyl phenyl group. This invention further relates to molding compositions which have been modified by the addition of guanidine monostearate and guanidine hydrochloride. This invention still further relates to clear, molded articles produced from the thermosetting molding compositions set forth hereinabove, which have been modified by the addition of a blended mixture of guanidine stearate and guanidine hydrochloride, and which have been heat and pressure molded.

The object of the present invention is to produce a molding composition which is capable of being converted into a molded article which has a very high degree of clarity to the point that it is virtually transparent. A further object of the present invention is to produce molding compositions which will cure rapidly upon the application of heat and pressure to produce molded articles having an unusually high degree of clarity. A further object of the present invention is to produce molded articles from molding compositions comprising melamine-formaldehyde resins and certain guanamine-formaldehyde resins, which have been modified with the addition of a lubricant and an acid catalyst. More specifically, the lubricant is guanidine monostearate and the catalyst is guanidine hydrochloride. These and other objects of the present invention will be discussed more fully hereinbelow.

In the field of molding compositions, it is often desirable to have a composition which will produce clear, molded articles when subjected to the application of heat and pressure in the mold. In the formulation of the molding compound such as by a rolling technique on heated, differential rolls, it is often times necessary to use a lubricant in order to prevent the resin formulation from sticking to the rolls in the course of the milling operation. Still further, in the actual molding operation, it is oftentimes necessary to incorporate a lubricating agent or a mold releasing agent into the molding composition in order to avoid the sticking of the molded article to the mold. This lubrication is sometimes accomplished by the use of such chemicals as the metallic stearates, i. e., zinc stearate, magnesium stearate, calcium stearate, and the like or by the use of fatty acids, fatty oils, or waxes. If the clarity of the molded article is of no consequence, such as when a translucent or opaque article is desired, these lubricants are quite satisfactory. These lubricants, as a class, however tend to introduce a considerable amount of opacity into the molding composition and for that reason, they are not suitable for use in the preparation of clear molding resins. The applicants have discovered that by the use of guanidine monostearate as a mold lubricant, they are able to produce clear, molded articles with a very high degree of transparency and a very low degree of opacity. This particular mold lubricant can be used without benefit of a curing catalyst, if it is desired to complete the molding operation over a comparatively long period of time. However, if it is desired to cure in a rather short period of time, it is necessary to add a curing catalyst to the molding composition so that this latter operation can be accomplished. Guanidine monostearate is somewhat alkaline and, in and of itself, tends to retard the cure of the molding composition so that in order to obtain the fast cure generally desired in commercial operations a catalyst must be added. Most acid catalysts are unsatisfactory for this purpose because when used in combination with the guanidine stearate, they tend to increase the opacity of the ultimate molded article. The exact reason for this increase in opacity is not known but it is believed and considered possible that some acid catalysts tend to replace the stearic acid and that the resultant haze is caused by the presence of free stearic acid. The applicants have found that by using guanidine hydrochloride as the acid catalyst and guanidine monostearate as the lubricant, they are able to produce fast curing, molding compositions which are adequately lubricated and which produce molded articles which have the desired degree of clarity. Obviously, in these molded compositions, many of the fillers which may normally be used would not be desirable because of the tendency of the fillers to increase the opacity of the final molded article. Certain of the fillers, however, particularly those which are transparent and which have the necessary optical properties may be used for certain applications. It will be completely obvious, however, that in some molded articles, there is no need for a filler.

In the practice of the process of the present invention, it is desired to use about 0.02–4% by weight of guanidine stearate based on the total weight of the resinous molding composition. It is preferred, however, that we use about 0.2–2.5% by weight of guanidine monostearate based on the total weight of the resinous molding composition. If one wishes to avoid the use of an acid curing agent, one could accomplish the end result by using no agent other than the lubricant. In this latter instance, however, as pointed out above, the curing cycle is unduly prolonged and it is not commercially desirable for most molding operations to use the lubricant alone. For fast cure, it is desired to use between 0.01–4.0% by weight of guanidine hydrochloride based on the total weight of the resinous molding composition, but one could use 0.2–3.0% by weight of guanidine hydrochloride as a preferred embodiment. The rate of cure of these molding compositions may be varied by adjusting the amount of guanidine hydrochloride present in the formulation. For a given weight of guanidine stearate present in the composition, the more guanidine hydrochloride present, the faster the cure will be. Thus, the cure time for a 4 x ⅛ inch disk may be varied from about 2 to 20 minutes.

The present inventive concept is applicable to a rather wide range of synthetic resinous molding compositions. For instance, one may use melamine-formaldehyde resins having mol ratios between 1:1.5 and 1:4, respectively, but preferably 1:1.5 and 1:2.0, respectively. Certain of the guanamine formaldehyde resins may be used in the practice of the process of the present invention such as those having the general formula:

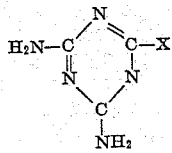

wherein X is H, or alkyl group containing from 1–6 carbon atoms inclusive, or a phenyl group or an alkyl phenyl group. If one wishes to use the guanamine formaldehyde resins, it is desired to have those resins with mol ratios of about 1:1 to 1:4, guanamine to formaldehyde, respectively, and preferably those with mol ratios of 1:1 to 1:2, respectively.

Amongst the guanamines which may be used are formoguanamine, acetoguanamine, 6-ethyl-2,4-diamino-1,3,5 triazine, 6-propyl 2,4-diamino-1,3,5 triazine; 6-butyl 2,4-diamino-1,3,5 triazine; 6-amyl 2,4-diamino 1,3,5-triazine; 6-hexyl 2,4-diamino 1,3,5-triazine; 6-phenyl 2,4-diamino 1,3,5-triazine and 6-alkyl ring-substituted phenyl 2,4-diamino-1,3,5-triazine such as 6-ortho methyl phenyl 2,4-diamino-1,3,5-triazine; 6-meta methyl phenyl 2,4-diamino 1,3,5-triazine, 6-para methyl phenyl 2,4-diamino 1,3,5-triazine; 6-ortho meta dimethyl phenyl; 2,4-diamino 1,3,5-triazine, 6-ortho para dimethyl phenyl; 2,4-diamino 1,3,5-triazine, 6-meta para dimethyl phenyl; 2,4-diamino 1,3,5-triazine, and the like.

The methods of preparation of the resins to be used in the molding compositions of the present invention are conventional of which the following examples will be sufficient to illustrate the manner in which these resins may be prepared. All parts are parts by weight.

MELAMINE-FORMALDEHYDE RESIN 126 parts of melamine and 162 parts of a 37% aqueous solution of formaldehyde are introduced into a suitable reaction chamber and the pH is adjusted to about 7. The reaction mixture is then heated up to reflux temperature and maintained at that temperature for approximately ½ hour. The pH of the reaction mixture is then adjusted to about 10 and the resinous product thus treated is spray dried and is ready for use in a molding composition.

BENZOGUANAMINE-FORMALDEHYDE RESIN 187 parts of benzoguanamine (6-phenyl 2,4-diamino-1,3,5-triazine) and 162 parts of a 37% aqueous formaldehyde solution are introduced into a suitable reaction chamber. The pH of the mixture is adjusted to approximately 6. The reaction mixture is then heated up to reflux temperature and maintained at that temperature for approximately ½ hour. The pH is then adjusted to about 8 and the resinous solution is then spray dried.

In order to illustrate the method of formulating the molding compositions of the present invention, the following examples are set forth, in which all parts are parts by weight. It should be remembered that these examples are set forth solely for the purpose of illustration and should not be interpreted as limitations on the case except as indicated in the appended claims.

*Example 1*

100 parts of a spray dried melamine-formaldehyde resin (mol ratio 1:2, respectively)
2 parts of guanidine hydrochloride
1 part of guanidine monostearate The catalyst and lubricant are thoroughly blended by ball milling. The resin is then added and the entire mixture is blended in a tumbling mill. The powderous mixture is worked, densified and sheeted on a 2 roll mill at 275–125° F. in 7–8 minutes. (The rolls of the mill are approximately 8 x 18".) The sheets are cooled and chopped to small granules. This composition was used to mold 4" x ⅛" disks by curing at 150° C. for 1¼ minutes at 3500 p. s. i. The weight increase after a 30 minute boil,

|  | Per cent |
|---|---|
| 2 minute cure | 0.74 |
| 4 minute cure | 0.28 |
| 6 minute cure | 0.28 |
| Opacity | 17. |

*Example 2*

100 parts of spray dried melamine-formaldehyde resin (mol ratio 1:2, respectively)

0.5 part guanidine monostearate
1.0 part guanidine hydrochloride

This formulation was prepared and blended in a manner comparable to that set forth hereinabove in Example 1 and the resultant composition was molded into 4" x ⅛" disks, which were observed to have the following properties:

Weight increase after 30 minute boil:

| | Per cent |
|---|---|
| 4 minute cure | 1.67 |
| 6 minute cure | 0.90 |
| 8 minute cure | 0.53 |
| 12 minute cure | 0.27 |

When disks were molded with the same melamine-formaldehyde resin but containing the usual lubricant and catalyst such as zinc stearate and phthalic acid anhydride, the opacity fell within the range of 66–74%.

In addition to using guanidine hydrochloride and guanidine monostearate in combination with one another, it is possible to use the fusion product of these two materials. However, in order to obtain optimum results the resin should be substantially free of stearic acid, or any free acid which is stronger than stearic acid.

*Example 3*

100 parts of spray dried melamine-formaldehyde resin (mol ratio of 1:2, respectively)
2 parts guanidine hydrochloride
1 part guanidine stearate This formulation was prepared and blended in a manner comparable to that set forth hereinabove in Example 1, and the resultant composition was molded into 4 x ⅛ inch disks which had opacities of 16% and a minimum cure of 1½–2 minutes.

It is not necessary that the resin be of the spray dried variety, as any drying operation may be used to convert the resin into the dry state such as by the tray drying or kettle drying processes. The lubricant may be added to the resin solid after the dehydration as indicated in the above examples or it may be incorporated into the resin syrup prior to the dehydration step.

If it is desired to produce special tints, translucencies, pearlescence, and the like, one may modify the molding composition with the appropriate pigments which are known to accomplish these added features.

In addition to using the melamine-formaldehyde resins and the guanamine-formaldehyde resins as described hereinabove, it is possible to modify these resins by incorporating therein varying amounts of other resins such as urea-formaldehyde resins, dicyandiamine-formaldehyde resins and the like.

We claim:
1. A molding composition comprising a thermosetting aminoplast resin selected from the group consisting of (a) a melamine-formaldehyde resin having a mol ratio of 1:1.5 to 1:4, respectively, and (b) a guanamine-formaldehyde resin having a mol ratio of 1:1 to 1:4, respectively, wherein said guanamine has the general formula:

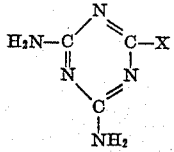

wherein X is selected from the group consisting of H, an alkyl group containing 1–6 carbon atoms inclusive, a phenyl group and an alkyl phenyl group, from 0.02 to 4.0% by weight of guanidine monostearate.

2. A molding composition comprising a thermosetting melamine-formaldehyde resin having a mol ratio of from 1:1.5 to 1:4, respectively, and from 0.02 to 4.0% by weight of guanidine monostearate.

3. A molding composition comprising a thermosetting melamine-formaldehyde resin having a mol ratio of from 1:1.5 to 1:2, respectively, and from 0.02 to 4.0% by weight of guanidine monostearate.

4. A molding composition comprising a thermosetting melamine-formaldehyde resin having a mol ratio of from 1:1.5 to 1:2, respectively, and from 0.2 to 2.5% by weight of guanidine monostearate.

5. A clear, molded article comprising the heat and pressure molded composition a melamine-formaldehyde molding resin having a mol ratio of 1:1.5 to 1:4, respectively, and 0.02–4% by weight of guanidine monostearate.

6. A clear, molded article comprising the heat and pressure molded composition, a melamine-formaldehyde molding resin having a mol ratio of 1:1.5 to 1:2, respectively, and 0.02–4% by weight of guanidine monostearate.

7. A clear, molded article comprising the heat and pressure molded composition, a melamine-formaldehyde molding resin having a mol ratio of 1:1.5 to 1:2, respectively, and 0.2–2.5% by weight of guanidine monostearate.

8. A molding composition comprising a thermosetting aminoplast resin selected from the group consisting of (a) a melamine-formaldehyde resin having a mol ratio of 1:1.5 to 1:4, respectively, and (b) a guanamine-formaldehyde resin having a mol ratio of 1:1 to 1:4, respectively, wherein said guanamine has the general formula:

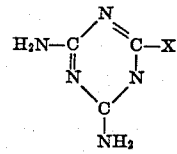

wherein X is a member of the group consisting of H, an alkyl group containing 1–6 carbon atoms inclusive, a phenyl group and an alkyl phenyl group, from 0.02 to 4.0% by weight of guanidine monostearate and from 0.01 to 4.0% by weight of the guanidine hydrochloride.

9. A molding composition comprising a thermosetting melamine-formaldehyde resin having a mol ratio of from 1:1.5 to 1:4, respectively, and from 0.02 to 4.0% by weight of guanidine monostearate and from 0.01 to 4.0% by weight of guanidine hydrochloride.

10. A molding composition comprising a thermosetting melamine-formaldehyde resin having a mol ratio of from 1:1.5 to 1:2, respectively, and from 0.02 to 4.0% by weight of guanidine monostearate and from 0.01 to 4.0% by weight of guanidine hydrochloride.

11. A molding composition comprising a thermosetting melamine-formaldehyde resin having a mol ratio of from 1:1.5 to 1:2, respectively, and from 0.2 to 2.5% by weight of guanidine monostearate and from 0.2 to 3.0% by weight of guanidine hydrochloride.

12. A clear, molded article comprising the heat and pressure molded composition, a melamine-formaldehyde molding resin having a mol ratio of 1:1.5 to 1:4, respectively, and 0.02–4% by weight of guanidine monostearate and 0.01 to 4% of guanidine hydrochloride.

13. A clear, molded article comprising the heat and pressure molded composition, a melamine-formaldehyde molding resin having a mol ratio of 1:1.5 to 1:2, respectively, and 0.02–4% by weight of guanidine monostearate and 0.01 to 4% of guanidine hydrochloride.

14. A clear, molded article comprising the heat and pressure molded composition, a melamine-formaldehyde molding resin having a mol ratio of 1:1.5 to 1:2, respectively, and 0.2–2.5% by weight of guanidine monostearate and 0.2–3.0% of guanidine hydrochloride.

15. A clear, molded article comprising the heat and pressure molded composition, a melamine-formaldehyde molding resin having a mol ratio of 1:1.5 to 1:2, respectively, and 0.02–4% by weight of guanidine monostearate and 0.2–3.0% of guanidine hydrochloride.

RICHARD LINDENFELSER.
CLARENCE L. MICHAUD.

REFERENCES CITED

The following references are of record in the file of this patent:

UNITED STATES PATENTS

| Number | Name | Date |
|---|---|---|
| 2,251,234 | Swain | July 29, 1941 |